(12) United States Patent
Herren

(10) Patent No.: US 9,717,368 B2
(45) Date of Patent: Aug. 1, 2017

(54) PUREEING UNIT FOR AN APPARATUS FOR PROCESSING FOODSTUFFS

(71) Applicant: Bruno Herren, Beckenried (CH)

(72) Inventor: Bruno Herren, Beckenried (CH)

(73) Assignee: swizzzProzzz AG, Beckenried (CH)

( * ) Notice: Subject to any disclaimer, the term of this patent is extended or adjusted under 35 U.S.C. 154(b) by 456 days.

(21) Appl. No.: 14/378,003

(22) PCT Filed: Feb. 7, 2013

(86) PCT No.: PCT/EP2013/052487
§ 371 (c)(1),
(2) Date: Aug. 11, 2014

(87) PCT Pub. No.: WO2013/117675
PCT Pub. Date: Aug. 15, 2013

(65) Prior Publication Data
US 2015/0014459 A1    Jan. 15, 2015

(30) Foreign Application Priority Data
Feb. 9, 2012 (CH) ...................... 00178/12

(51) Int. Cl.
*A47J 42/24* (2006.01)
*A47J 43/10* (2006.01)

(52) U.S. Cl.
CPC ........... *A47J 42/24* (2013.01); *A47J 43/1068* (2013.01)

(58) Field of Classification Search
CPC .............. A47J 42/24; A47J 43/1068

USPC ..................... 241/92, 282.1, 282.2
See application file for complete search history.

(56) References Cited

U.S. PATENT DOCUMENTS

| | | | |
|---|---|---|---|
| 4,076,180 A * | 2/1978 | Liu | B02C 18/10 |
| | | | 241/154 |
| 4,560,111 A * | 12/1985 | Cavalli | A47J 43/0722 |
| | | | 241/282.2 |
| 4,700,903 A | 10/1987 | Henn | |
| 5,782,416 A | 7/1998 | Nejatbina | |
| 2008/0198691 A1 | 8/2008 | Behar et al. | |
| 2008/0301952 A1 | 12/2008 | Holcomb et al. | |
| 2010/0071219 A1 | 3/2010 | Lin | |
| 2011/0226140 A1 | 9/2011 | Herren | |

FOREIGN PATENT DOCUMENTS

| | | |
|---|---|---|
| CN | 101478904 A | 7/2009 |
| EP | 0 536 030 A1 | 4/1993 |
| JP | 61-86139 U | 6/1986 |
| JP | 63-158028 A | 7/1988 |
| RU | 2409960 C1 | 1/2011 |
| WO | WO 2007/128154 A1 | 11/2007 |
| WO | WO 2008/154400 A1 | 12/2008 |
| WO | WO 2010/150263 | 12/2010 |

* cited by examiner

*Primary Examiner* — Mark Rosenbaum
(74) *Attorney, Agent, or Firm* — Pauley Erickson & Kottis

(57) ABSTRACT

The invention relates to a pureeing unit (1) for an apparatus for processing foodstuffs with at least one knife (31, 32) arranged radially to a rotation axis (2) and with at least one blade (41, 42) arranged radially to the rotation axis (2). The at least one knife (31, 32) and the at least one blade (41, 42) are rotatable about the rotation axis (2).

20 Claims, 2 Drawing Sheets

PUREEING UNIT FOR AN APPARATUS FOR PROCESSING FOODSTUFFS

BACKGROUND OF THE INVENTION

Field of the Invention

The invention relates to a pureeing unit for an apparatus for processing foodstuffs and to an apparatus with such a pureeing unit.

Discussion of Related Art

Hand-operated apparatus which comprise knives arranged on a working shaft for size reduction of foodstuffs are known from the state of the art. The working shaft with the knives is located in a foodstuffs container of the hand-operated apparatus and is made to rotate, for example by a drive device with a pull cord. Thus, the most varied of foodstuffs such as e.g. onions, carrots, etc. can be reduced in size or minced in an efficient manner with little effort. Such apparatus are not very suitable for making a puree or mash. In the state of the art, a puree or mash is made with a straining apparatus (also known as a blender, strainer mill or vegetable mill) or with a mincer with inserted perforated plates. However, this demands additional expense with regard to apparatus to be purchased and maintained.

SUMMARY OF THE INVENTION

It is an object of the invention to present a pureeing unit for an apparatus for processing foodstuffs, which does not have at least certain disadvantages of the state of the art. In particular, the pureeing unit should be able to be used in a known device for processing foodstuffs, in order to make a puree or a mash.

This object is achieved by the features defined in the independent patent claim 1. A pureeing unit for an apparatus for processing foodstuffs has at least one knife which is arranged radially to a rotation axis and at least one blade arranged radially to the rotation axis, wherein the at least one knife and the at least one blade are rotatable on the rotation axis. If this pureeing unit is made to rotate in a foodstuffs container with foodstuffs located therein, then a pureeing of the foodstuffs which are cut up by the knife and hit on the blade is effected, by which means a further processing is effected.

In one embodiment variant, a knife and a blade are component parts of a pureeing segment and are arranged to one another in the axial direction of the rotation axis in a manner such that a pureeing of foodstuffs is effected when using the pureeing unit in an apparatus for processing foodstuffs. With the use of the apparatus for processing foodstuffs with the pureeing unit arranged therein, the knives and the blades can be located at a comparable distance to the base of a foodstuffs container. Thus the foodstuffs are firstly cut up in the region of the knives and blades and then hit the blades, by which means a further processing of the foodstuffs is effected. A pureeing of the foodstuffs is effected due to the action of the knives and blades.

In another embodiment variant, a knife and blade are component parts of a pureeing segment and are pivotable in relation to one another on a rotation axis up to a maximal pivot angle, or are at a fixed angle to one another. With pivotable knives and blades, the pureeing unit may be arranged in a particularly compact manner for keeping or storage. The pivotable knives and blades can moreover positively influence the starting-up when pureeing, since firstly it is only the knives that cooperate with the foodstuffs and only after for example half a revolution that the blades do the same. The arrangement at a fixed pivot angle, thus the rigid arrangement of the knives and blades can lead to a cost saving when manufactured and to an increased longevity of the pureeing unit.

The knives and/or blades can thus be arranged in a fixed or pivotable manner on the rotation axis according to preferred embodiments of the invention. This is also true for such embodiments, wherein a number of knifes and blades are arranged individually and not in pureeing segments on the rotation axis, or embodiments wherein a number of knifes and blades are provided in at least one pureeing segment. Thus, according to the present invention all knifes and blades may be arranged in a radial position, rigidly or pivotally arranged on the rotation axis, or only one or more than one of the aforementioned processing tools may be rigidly arranged on the rotation axis, while the remaining knifes and/or blades are arranged pivotally.

In one embodiment variant, the maximal pivot angle or the fixed pivot angle is 180°. The knives and blades are then arranged essentially diametrically. With trials, it has been found that the diametrical arrangement of the knives and blades leads to an efficient pureeing of foodstuffs.

In one embodiment variant, a first knife and also a first blade are component parts of a first pureeing segment, and a second knife and also as a second blade are component parts of a second pureeing segment. The first pureeing segment and the second pureeing segment are pivotable to one another up to a maximal segment angle or are at a fixed segment angle to one another. The pivoting of the pureeing segments can positively influence the starting behaviour, since the pureeing segments are applied one after the other. In the case that the pureeing segments are at a fixed segment angle to one another, i.e. are rigidly arranged, this can lead to a cost saving in manufacture or an improvement of the longevity of the pureeing unit.

In one embodiment variant, the maximal segment angle or the fixed segment angle is 90°. With trials, it has been found that an angle of 90° leads to an efficient pureeing of foodstuffs.

In another embodiment variant, a blade comprises perforations, in order to, when using the pureeing unit, effect a pureeing of foodstuffs. The foodstuffs, when using the pureeing unit, are pressed through the perforations, which leads to an efficient pureeing.

According to preferred embodiment forms, the edges of the holes in the blade are designed to have small radii, i.e. in a sharp-edges manner, in order to improve the pureeing effect. Here, one should emphasise the fact that the pureeing blades are designed to be of sufficient stability, preferably of sheet metal, in order to efficiently puree the foodstuffs present in form of coarse pieces. These foodstuffs are reduced in size to a lesser or greater extent depending on the number and speed of the rotation, of the pureeing blades, and thereby also mixed.

In a further embodiment variant, a first blade and a second blade have equal or different perforations. Thus the blade which is located closer to the base of the foodstuffs container of the apparatus for processing foodstuffs can have smaller perforations than the blade which is distanced further to the base. The already almost liquid puree or mash preferably collects in the region of the base and is additionally pureed by way of the smaller perforations. With trials, it has been found that an equal perforation of the two blades leads to an efficient pureeing of foodstuffs. An equal perforation of the blades simplifies the manufacturing process of the pureeing unit and can thus save costs.

In another embodiment variant, one blade comprises a wiper device. The wiper device can be configured to wipe partially pureed foodstuffs from the inner wall of the foodstuffs container and to transport it into the active region of the knives and blades, so that a complete pureeing is effected.

In a further embodiment variant, first blade comprises a first wiper device and a second blade a second wiper device, wherein the first wiper device and the second wiper device have equal or different dimensions. The wiper device of the blade facing the base can be designed to be shorter, since this blade is arranged close to and above the base. The wiper device which is distanced further from the base can be designed to be longer, since a greater distance is on hand between this blade and the upper edge of the foodstuffs container. A greater region of the inner region of the foodstuffs container can be free from partially pureed foodstuffs and these be transported into the region of the knives and blades for further processing, due to the different dimensions of the wiper devices.

In one embodiment variant, a deflector device is arranged radially to the rotation axis and is rotatable about the rotation axis and is configured to transport foodstuffs and material to be cut, into the region of the knives and blades. The deflector device can be arranged in the vicinity of the cover of the apparatus for processing foodstuffs, so that partially pureed foodstuffs can be transported from the cover back into the region of the knives and blades and be processed further.

In one embodiment variant, a receiver opening is provided at one end of the pureeing unit, for cooperation with a bearing pin of a foodstuffs container of the apparatus for processing foodstuffs. The pureeing unit can thus be mounted in the foodstuffs container in a stable manner, which can improve the efficiency on pureeing.

In another embodiment variant, a drive cam is provided on one end of the pureeing unit, for cooperation with a drive device of the apparatus for processing foodstuffs. By way of this, the pureeing unit can be set into rotation as well as also mounted in a stable manner, which can improve the efficiency on pureeing.

In the apparatus for processing foodstuffs according to the invention, in one preferred embodiment the container for foodstuffs and the blades of the pureeing unit are matched to one another in such a way, that the blades almost reach the entire inner volume of the food container. The not workable dead volume in the area of the bottom, the lid and the inner wall of the container is either minimized by the aforementioned wiper devices and/or deflector devices or for embodiments without wiper devices and/or deflector devices the dead volume is reduced to a cross sectional area below 10%, preferably below 5%.

BRIEF DESCRIPTION OF THE DRAWINGS

The invention is hereinafter explained by way of figures which only represent embodiment examples. There are shown in.

DETAILED DESCRIPTION OF THE INVENTION

Figure 1:
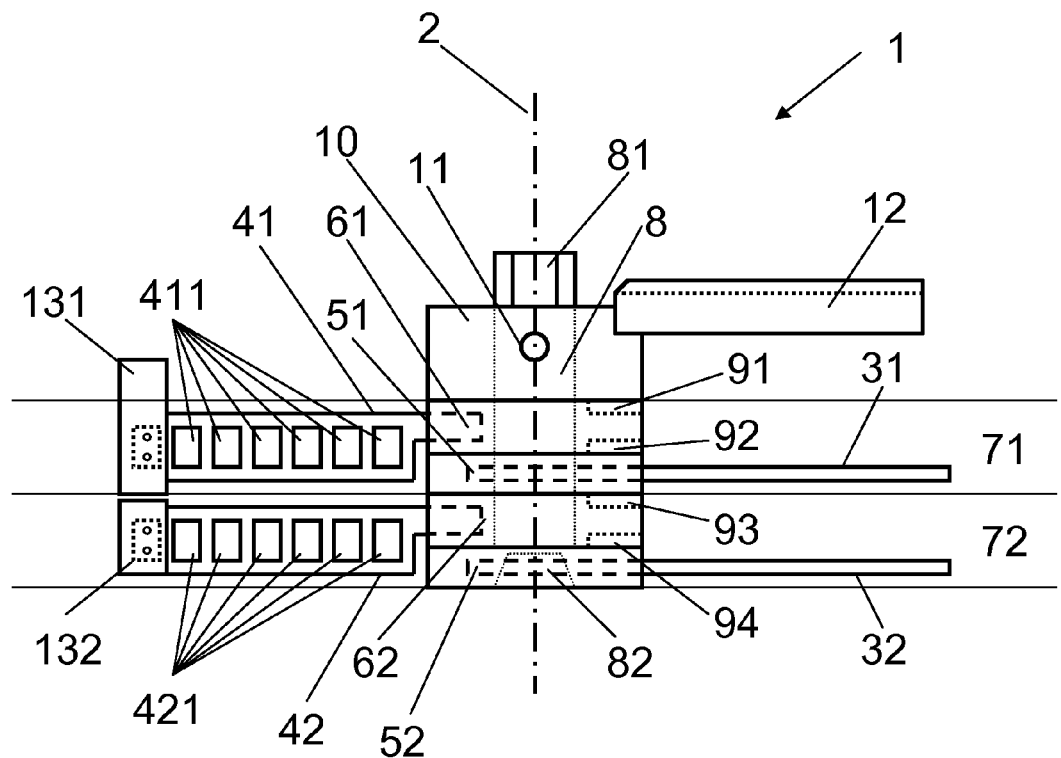
FIG. 1 schematically, a section through a pureeing unit.

FIG. 1 schematically shows a section through a pureeing unit 1 according to the invention, which has a rotation axis 2. A first knife 31 and a second knife 32 are arranged radially to the rotation axis 2. A first blade 41 and a second blade 42 are likewise arranged radially to the rotation axis 2. The first knife 31, the second knife 32, the first blade 41 and the second blade 42 are rotatable about the rotation axis 2.

The first knife 31 can be arranged on a first knife holder 51 and the second knife 32 on a second knife holder 52. The first blade 41 can be arranged on a first blade holder 61 and the second blade 42 on a second blade holder 62. The first knife holder 31, the second knife holder 32, the first blade holder 61 and the second blade holder 62 can be designed essentially in each case as a cylindrical body, wherein the axes of these cylindrical bodies coincide with the rotation axis 2.

As is shown in FIG. 1, firstly the first blade holder 61, then the first knife holder 51, then the second blade holder 62 and finally the second knife holder 52 are arranged from the top to the bottom in the axial direction. The first knife holder 51 and the first blade holder 61 together with the first knife 31 and the first blade 42 are component parts of a first pureeing segment 71. Accordingly, the second knife holders 52 and the second blade holder 62 together with the second knife 32 and the second blade 42 are component parts of the second pureeing unit 72.

The pureeing unit 1 is provided in order to be arranged in an apparatus for processing foodstuffs, which comprises a foodstuffs container which can be closed with a cover. The pureeing unit 1 is arranged in the foodstuffs container when in use, wherein for example the first pureeing segment 71 is located closer to the cover and the second pureeing segment 72 closer to the base of the foodstuffs container.

The pureeing unit 1 can comprise a working shaft 8 which for example is integrally formed on the second knife holder 52. The second blade holder 62, the first knife holder 51 and the first blade holder 61 can be applied on the drive shaft 8 one after the other. An end-holder 10 can be provided subsequently to the first blade holder 61 and be fastened on the working shaft 8 by way of a cotter pin 11 for example. Abutment devices 91, 92, 93 94 can be provided, which in the known manner comprise grooves and cams, in order to permit a mutual pivoting of the knife holders 51, 52, of the blade holders 61, 62 as well as the end-holder 10 in an angular range, or to create a rigid mutual alignment. A drive cam 82 can be provided at the end of the working shaft 8 which is at the top according to FIG. 1, for the cooperation with a drive device of an apparatus for processing foodstuffs. A receiver opening 82 can be provided at the lower end of the second knife holder 52, for the cooperation with a bearing pin of a container of the apparatus for processing foodstuff.

The working shaft 8 may be manufactured from a single work-piece, wherein the knife holders 51, 52, the blade holders 61, 62 and the end-holder 10 are applied on the working shaft 8. In this case, the receiver opening 10 can also be provided at one end of the working shaft 8.

The first knife 31 and the first blade 41 of the first pureeing segment 71 can be arranged to one another in the axial direction in a manner such that a pureeing of foodstuffs is effected with the use of the pureeing unit 1 in the apparatus for processing foodstuffs. Thus the first knife 31 and the first blade 41 in particular can be arranged in a manner such that a plane perpendicular to the rotation axis 2 encompasses parts of the first knife 31 as well as of the first blade 41. In other words, with the use of the pureeing unit 1, the knife 31 and the blade 41 are located at a comparable height above the base of the foodstuffs container. The same applies to the second knife 32 and the second blade 42. On use of the pureeing unit, these are set into rotation, wherein the foodstuffs arranged in the foodstuffs container is cut up by the knives 31, 32 and is processed further by the blades 41, 42. The knives 31, 32 for cutting up the foodstuffs comprise cutting edges in the rotational direction, with which the foodstuffs are cut up. The blades 41, 42 for processing the foodstuffs comprise surfaces in the rotation direction, onto which the foodstuffs strike. With a rotation of the pureeing unit 1, the foodstuffs are pureed by the knives 31, 32 and the blades 41, 42.

As mentioned, the knives 31, 31 and the blades 41, 42 can be pivotable to one another about the rotation axis 2 or be arranged at a fixed pivot angle to one another, i.e. in a rigid manner. Pivotable knives 31, 32 and blades 41, 42 for example have the advantage that when the pureeing unit 1 is not in use, this requires less space for storage, since the knives 31, 32 and blades 41, 42 can be pivoted for example essentially into a plane which contains the rotation axis 2. Moreover, such a pureeing unit 1 can have the advantage that the knives 31, 32 and the blades 41, 42 firstly lie essentially in a plane which contains the rotation axis 2, after the insertion of the pureeing unit into the foodstuffs container of the apparatus for processing foodstuff. On rotating the pureeing unit 1, the knives 31, 32 and the blades 41, 42 one after the other pivot into the respective positions, by which means the starting of the pureeing unit 1 is simplified, since the resistance of the knives 31, 32 and blades 41, 42 which are moved through the foodstuffs, is built up only in steps. Practical trials have shown that this advantage is not of any large significance and a pureeing unit 1 with rigidly arranged knives 31, 32 and blades 41, 42 functions practically just as well as a pureeing unit 1 with pivotable knives 31, 32 and blades 41, 42.

Generally, one can say that the blades 41, 42 comprise perforations 411, 421 which on different blades 41, 42 can be designed the same or differently. The perforations according to the invention can be designed in a rectangular, elongate, oval or circular manner or in any manner. The size of the perforations can be selected such that the ratio between the blade regions which have a perforation and blade regions which consist of a material is larger than 1, i.e. that there is more empty area than material area. The ratio between the hole region and material region can also be about 1, i.e. that roughly the same empty surface as material surface exists. Finally, the ratio between the hole region and material region can also be smaller than 1, i.e. less hole region than material region exists. The number of perforations may be selected relatively small and for example be between 4 and 10. In this case, the blades have relatively large perforations. The number of perforations with the same ratio between the hole region and material region can also be selected relatively large and for example be between 100 and 500. In this case, the blades have relatively small perorations. Experiments have ascertained that that roughly 4 to 6 oval perorations or elongate holes result in a good pureeing performance.

Figure 2:
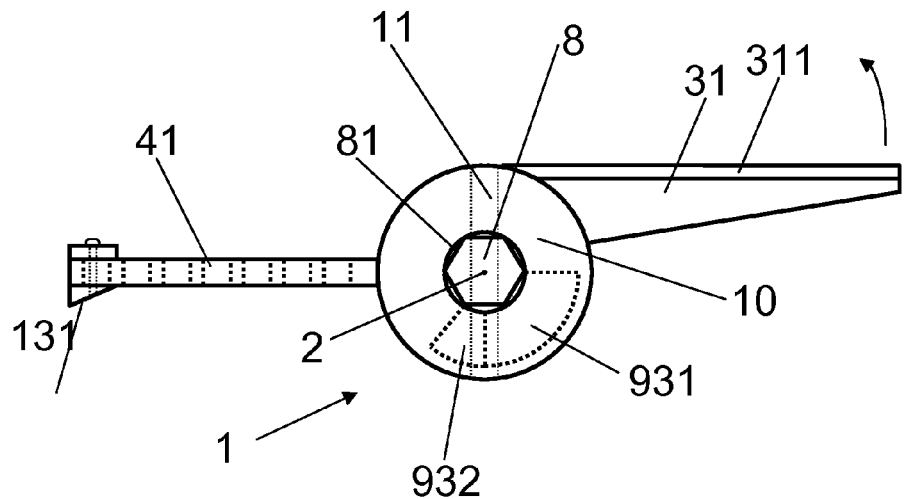
FIG. 2 schematically, a plan view of a pureeing unit.

FIG. 2 schematically shows a view of the pureeing unit 2. Evident are the first knife 31 and the first blade 41 which are arranged radially to the rotation axis 2. A cutting edge 311 is located on the first knife 31 in the rotation direction which is schematically represented in FIG. 2 with an arrow. The second knife 32 is constructed accordingly and in particular likewise comprises a cutting edge (not evident in FIG. 2).

The working shaft 8 with the drive cam 82 is represented schematically in FIG. 2. The axis of the drive shaft 8 coincides with the rotation axis 2. Moreover, a groove 931 which is configured for cooperating with cam 932 is represented in FIG. 2. The groove 931 can for example be incorporated on the second blade holder 62, and the cam 932 on the first knife holder 51. The groove 931 and the cam 932 can form an abutment device 93 which is provided between the first knife holder 51 and the second blade holder 62. In an analogous manner, further abutment devices 91, 92, 94 can be provided between the remaining knife holders, blade holders and the end-holder. The abutment device 93 according to FIG. 2 can be configured in order to permit a pivoting of 90° which in particular can correspond to the segment angle between the first pureeing segment 71 and the second pureeing segment 72.

The abutment devices 92, 94 between the knife holders 51, 52 and the blade holders 61, 62 can be configured in a manner such that the blades can be pivoted onto the side of the knives 31, 32 which is away from the cutting edge 311. The pureeing unit 1 can thus be very compact for its storage. The abutment devices 92, 94 can further be configured such that after pivoting the blade holders 61, 62 by 180°, these lie essentially diametrically opposite the knives 31, 32 as represented in FIG. 2. With the use of the pureeing unit 1 thus the foodstuffs are cut up by the knives 31, 32 and further processed by the blades 41, 42, wherein the pureeing of the foodstuffs is effected.

As is shown in FIG. 1, a deflector device 12 can be provided on the end-holder 10 and with the use of the pureeing unit 1 and of the apparatus for processing foodstuffs has the effect that foodstuffs or material to be cut, which can collect on the cover of the apparatus for processing foodstuffs when in use, is continuously transported into the region with the knives 31, 32 and the blades 41, 42.

As is sketched in FIG. 1 and FIG. 2, wiper devices 131, 132 can be provided at the ends of the blades 41, 42. These can be manufactured of a rubber-like material and have a very thin, tapering, soft, flexible lip, so that a sticking of foodstuffs or cut material on the inner side of the container of the apparatus for processing foodstuffs is avoided. The wiper devices 131, 132 can for example be attached together with a holding plate on the blades 41, 42 in a warm-riveted manner.

Figure 3:
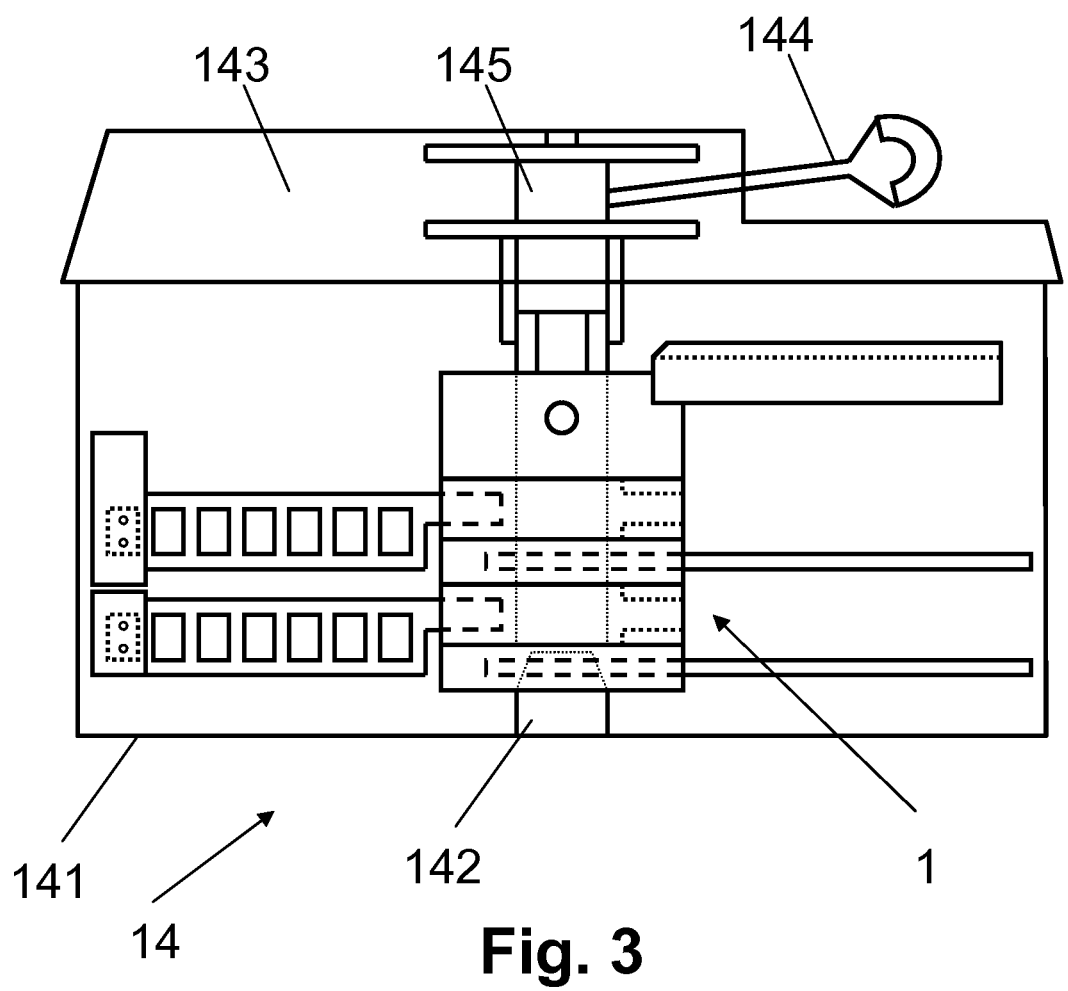
FIG. 3 an apparatus for processing foodstuffs with a pureeing unit arranged therein.

FIG. 3 schematically shows an apparatus 14 for processing foodstuffs. The processing apparatus 14 comprises a foodstuffs container 141 which has a bearing pin 142. The pureeing unit 1 is mounted in the bearing pin 142. The apparatus 14 is closed with a clover 143. A pull cord 143 is attached on the cover 143 and cooperates with a drive device 145, in order to set the pureeing unit 1 into rotation.

The invention claimed is:

1. A pureeing unit (1) for an apparatus for processing foodstuffs comprising:
    at least one knife (31, 32) arranged radially to a rotation axis (2) and at least one blade (41, 42) arranged radially to the rotation axis (2), wherein the at least one knife (31, 32) and the at least one blade (41, 42) are rotatable about the rotation axis (2) and
    wherein the at least one blade (41, 42) comprises perforations (411, 421).

2. The pureeing unit (1) according to claim 1, wherein the at least one knife (31, 32) and the at least one blade (41, 42) are component parts of a pureeing segment (71, 72) and are arranged to one another in the axial direction of the rotation axis (2) in a manner such that a pureeing of foodstuffs is effected with the use of the pureeing unit (1) in an apparatus for processing foodstuffs.

3. The pureeing unit (1) according to claim 1, wherein the at least one knife (31, 32) and the at least one blade (41, 42) are component parts of a pureeing segment (71, 72) and are pivotable to one another about the rotation axis (2) up to a maximal pivot angle or are at a fixed pivot angle to one another.

4. The pureeing unit (1) according to claim 1, wherein all knives and blades are firmly arranged on the rotation axis, or at least one knife (31, 32) and/or at least one blade (41, 42) are relatively pivotable in a limited pivot angle about the rotation axis (2), wherein all knives and blades are located with respect to one another in a fixed pivot angle or at least one knife and at least one blade are relatively pivotable in relation to one another.

5. The pureeing unit (1) according to claim 3, wherein the maximal pivot angle or the fixed pivot angle is 180°.

6. The pureeing unit (1) according to claim 1, wherein a first knife (41) as well as a first blade (51) are component parts of a first pureeing segment (71), and a second knife (42) as well as a second blade (52) are component parts of a second pureeing segment (72), wherein the first pureeing segment (71) and the second pureeing segment (72) are pivotable to one another up to a maximal segment angle or are at a fixed segment angle to another.

7. The pureeing unit (1) according to claim 6, wherein the maximal segment angle or the fixed segment angle is 90°.

8. The pureeing unit (1) according to claim 1, wherein a first blade (41) and a second blade (42) have equal or different perforations (411, 421).

9. The pureeing unit (1) according to claim 1, wherein the at least one blade (41, 42) comprises a wiper device (131, 132).

10. The pureeing unit (1) according to claim 1, wherein a first blade (41) comprises a first wiper device (131) and a second blade (42) comprises a second wiper device (132), wherein the first wiper device (131) and the second wiper device (132) have the same or different dimensions.

11. The pureeing unit (1) according to claim 1, wherein a deflector device (12) is arranged radially to the rotation axis (2) and is rotatable about the rotation axis (2) and is configured to transport foodstuffs and material to be cut, into the region of the knives and blades.

12. The pureeing unit (1) according to claim 1, further comprising a receiver opening (82) provided at one end of the pureeing unit (1), for the cooperation with a bearing pin of a foodstuffs container of the apparatus for processing foodstuffs.

13. The pureeing unit (1) according to claim 1, further comprising a drive cam (81) provided at one end of the pureeing unit (1), for cooperation with a drive device of the apparatus for processing foodstuffs.

14. An apparatus for processing foodstuffs, comprising a foodstuffs container, a drive unit and a pureeing unit according to claim 1.

15. A pureeing unit (1) for an apparatus for processing foodstuffs comprising:
at least one knife (31, 32) arranged radially to a rotation axis (2) and at least one blade (41, 42) arranged radially to the rotation axis (2), wherein the at least one knife (31, 32) and the at least one blade (41, 42) are rotatable about the rotation axis (2) and
wherein the at least one blade (41, 42) comprises a wiper device (131, 132).

16. The pureeing unit (1) according to claim 15, wherein the at least one knife (31, 32) and the at least one blade (41, 42) are component parts of a pureeing segment (71, 72) and are arranged to one another in the axial direction of the rotation axis (2) in a manner such, that a pureeing of foodstuffs is effected with the use of the pureeing unit (1) in an apparatus for processing foodstuffs.

17. The pureeing unit (1) according to claim 15, wherein the at least one knife (31, 32) and the at least one blade (41, 42) are component parts of a pureeing segment (71, 72) and are pivotable to one another about the rotation axis (2) up to a maximal pivot angle or are at a fixed pivot angle to one another.

18. The pureeing unit (1) according to claim 15, wherein all knives and blades are firmly arranged on the rotation axis, or at least one knife (31, 32) and/or at least one blade (41, 42) are relatively pivotable in a limited pivot angle about the rotation axis (2), wherein all knives and blades are located with respect to one another in a fixed pivot angle or at least one knife and at least one blade are relatively pivotable in relation to one another.

19. The pureeing unit (1) according to claim 15, wherein the maximal pivot angle or the fixed pivot angle is 180°.

20. The pureeing unit (1) according to claim 15, wherein a first knife (41) as well as a first blade (51) are component parts of a first pureeing segment (71), and a second knife (42) as well as a second blade (52) are component parts of a second pureeing segment (72), wherein the first pureeing segment (71) and the second pureeing segment (72) are pivotable to one another up to a maximal segment angle or are at a fixed segment angle to another.

* * * * *